Nov. 20, 1951    R. DEL NERO    2,575,658
BEER FAUCET
Filed Nov. 21, 1947    2 SHEETS—SHEET 2
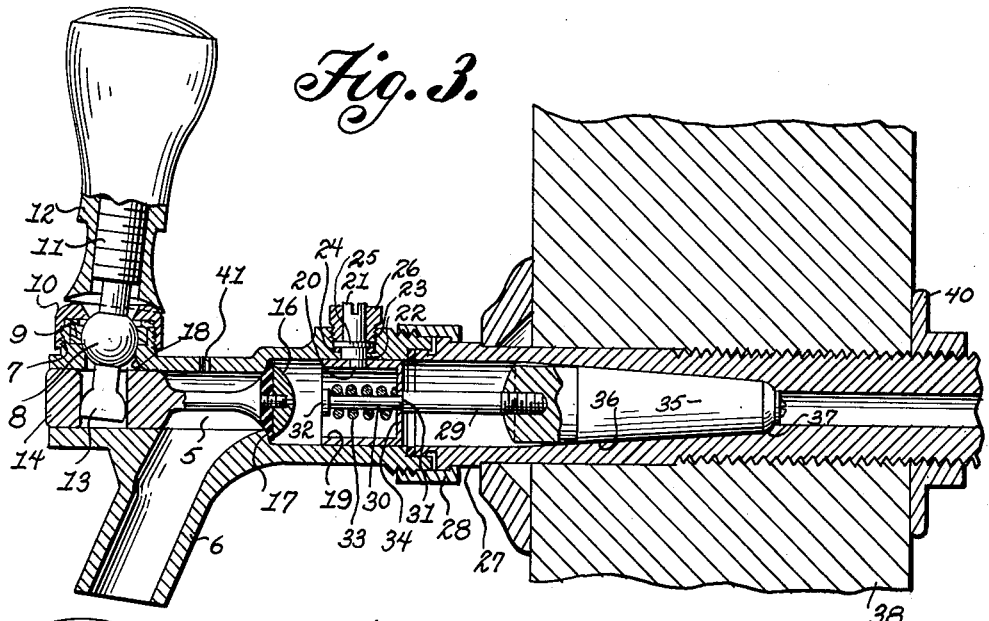
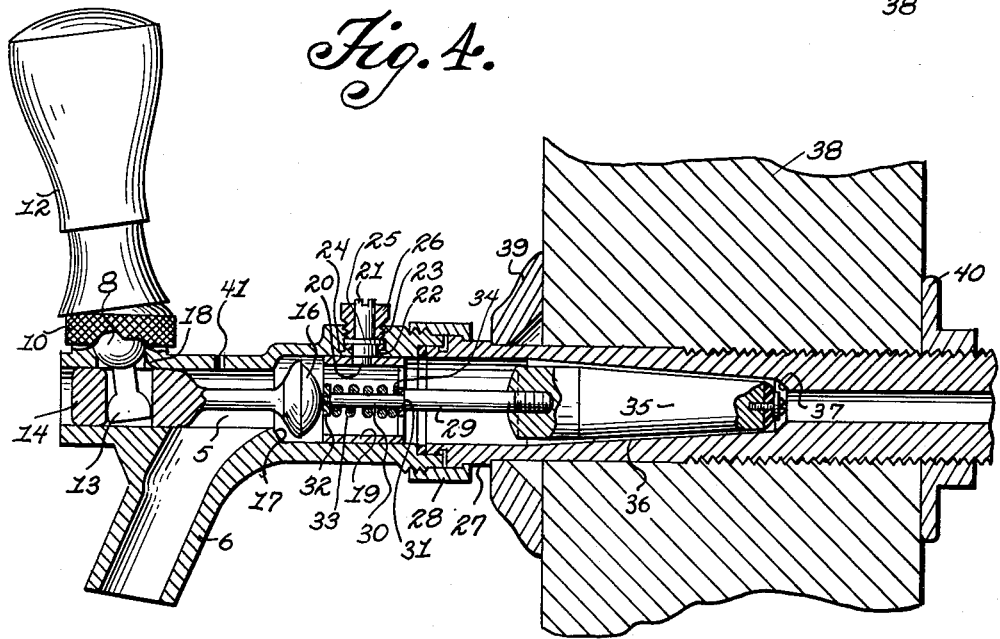
INVENTOR.
Roger Del Nero
BY Victor J. Evans & Co.
ATTORNEYS Patented Nov. 20, 1951

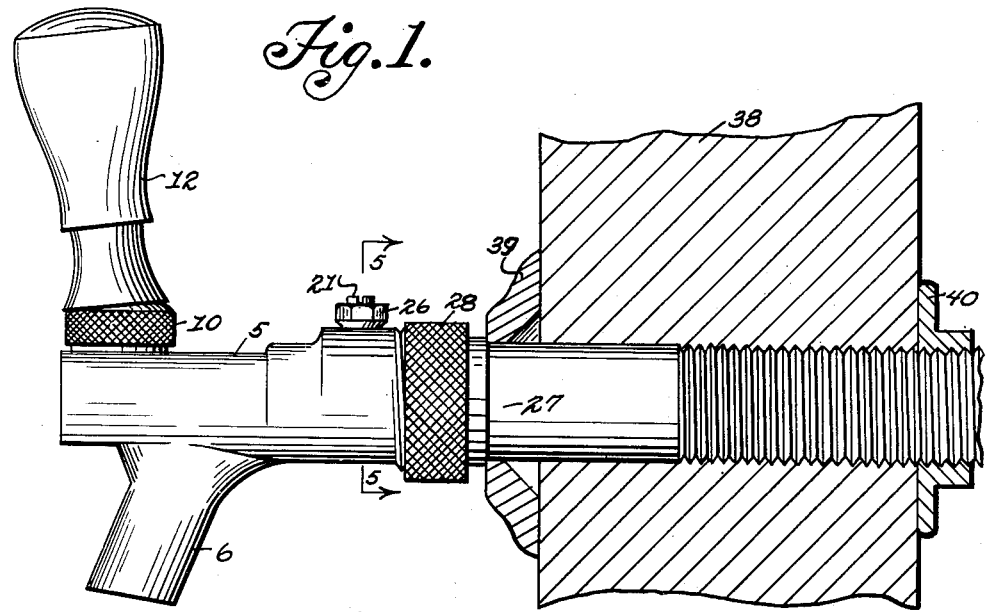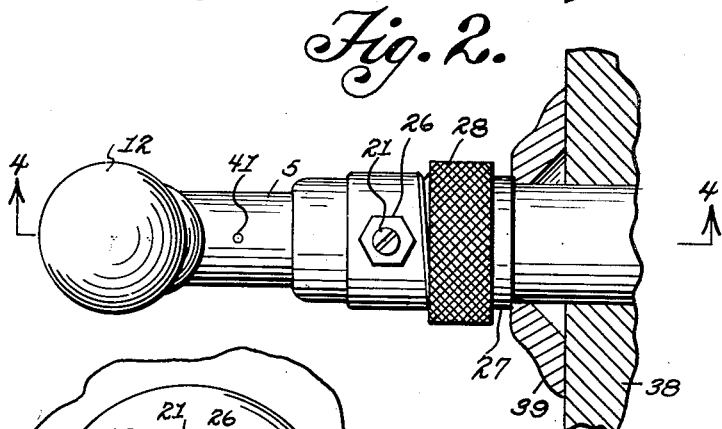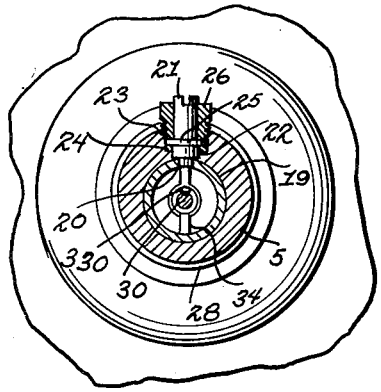

2,575,658

UNITED STATES PATENT OFFICE 2,575,658

BEER FAUCET

Roger Del Nero, Rome, N. Y.

Application November 21, 1947, Serial No. 787,334

8 Claims. (Cl. 277—42)

This invention relates to improvements in faucets used for drawing beer.

Beer has always presented problems in dispensing. It contains carbon dioxide gas, which in a sealed keg is held in solution. Upon tapping of the keg, however, it is necessary to apply pressure from an external source to keep the gas dissolved within the keg, this pressure ranging, for example, from 25 to 35 pounds. It would be desirable to retain the gas in solution until the beer is dispensed from the faucet. It is here, however, that many problems arise, and these will be mentioned briefly.

For example, the faucet is of course exposed to room temperature, and yet should be chilled if a good glass of beer is to be drawn, since the relative warmth of the faucet may cause excessive foaming of the beer by release of the gas. Keeping a faucet at a single low temperature is practically impossible, because it might be inactive for a time, during a slack period of sales, and become relatively warm.

At other times, continuous drawing will keep it chilled. All this can happen during the use of a single keg. After a period of inactivity, good bartenders "spit the faucet" before drawing the next glass, that is, they clear the faucet of beer trapped therein that may be stale, and of escaped gases rising to the faucet through the supply lines and coils. The loss of good beer through the drain, before the faucet is again dispensing beer properly, has been considerable.

Other factors affect the drawing of beer, too, as for instance, agitation of the beer within the keg when tapping, the melting of ice in the coil box, and change of temperature in a mechanically cooled system.

From the above, it is seen that merely putting a keg under a pressure previously determined as best will not in itself result in each and every glass drawn having no more than a proper amount of foam, even though the particular bartender may be fully expert in his work. This has been the problem, and to meet it, the art has concerned itself with devising a faucet that can be adjusted by the bartender to meet varying conditions experienced from glass to glass. All such faucets as have been commercially practicable have been of a two-valve type, having a main valve operated by the usual knob lever, and a second valve separately adjustable for the purpose of restricting the passageway through the faucet in varying degree.

So far as I am aware, however, the faucets heretofore devised, and aimed at conquering the conditions mentioned, have still not presented an adequate solution to these problems. Mainly, this is because a bartender, holding the glass, and also the knob lever, is unable to adjust the second, or flow control valve, during the actual drawing. This is when it is most important to do so, because he does not note any change in the characteristics of the beer until he actually begins drawing. If he has to stop drawing, make an adjustment of the flow control valve, test the new position, and perhaps stop and make still another adjustment, valuable time is lost. Or, if he attempts an adjustment without stopping, he must relinquish the knob lever. Usually, by the time he reaches the adjustment lever, the glass is overflowing.

Additionally, the provision of faucets of this type has brought forth an undesirable condition, in that many of them contain so many parts that they not only can get out of order easily, but what is more important, perhaps, the volume of parts, and the comparatively large size of the faucet, affects adversely proper chilling thereof, and tends to bring forth one of the very conditions intended to be overcome.

I have had in mind, then, the provision of a faucet that can be small and will have less parts than other faucets intended to accomplish the same purpose; that will permit an adjusted setting of the flow control valve, to be made on installation, taking into consideration such factors as beer temperature desired, length and size of supply lines and coils, and the pressure applied to the keg; that will additionally permit the bartender to make further adjustment of said valve during actual drawing, to meet varying abnormal and unexpected conditions not expected at the time the drawing of the glass began, such further adjustment to be made immediately and without loss of control of the knob lever; and that will permit "spitting of the faucet" without loss of good beer.

To this end, the presently preferred form of my invention embodies, mainly, a faucet having a main valve operated by the conventional knob lever; a flow control valve; an adjusting sleeve that effects an adjusted, normal setting of the flow control valve, usually made at installation, this means being capable of being locked; and a stem that extends from the flow control valve and is engageable by the main valve, whereby the bartender can make a further adjustment of the flow control valve during drawing by operation of the knob lever.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a side elevational view of a faucet constructed in accordance with the invention, mounted for use;

Figure 2 is a top plan view, part being broken away;

Figure 3 is a longitudinal vertical sectional view, in which parts remain in elevation;

Figure 4 is a similar view, taken on line 4—4 of Figure 2;

Figure 5 is a transverse section on line 5—5 of Figure 1;

Figure 6 is a plan view of a sleeve constituting part of an adjustment means for effecting an adjusted normal setting of the flow control valve; and Figure 7 is an end elevation of the sleeve.

Referring to the drawings in detail, 5 is a hollow faucet body, having the usual depending spout 6. Upstanding from the outer end of the body is a threaded nipple 7, in which is movably seated a ball 8. Also seated in the nipple is a ball washer 9, cooperating with the nipple to further define a ball seat. The parts are held properly assembled by a bonnet 10, knurled for convenient assembly of the parts, this being threaded on the nipple and against the washer and ball.

Integral with and upstanding from the ball 8 is a threaded lever 11, to which is connected a knob 12. Also integral with the ball, but depending therefrom, is a ball section 13. This projects into the bore of the body 5, into the apertured head 14 of a slidable shaft 15, the other end of which carries a main valve 16, preferably a mushroom valve. When the valve is closed, as in Figure 3, it seats against an annular shoulder 17 formed in the bore of the body intermediate its ends.

The parts so far described are in general conventionally formed and arranged. As will be seen, opening of the valve to any extent, as to the position shown, for example, in Figure 4, defines a passage at the shoulder for the beer, this passage being of constant diameter.

In the invention, however, and referring now to Figures 3 and 4, a portion of the inner wall of the nipple, and of the body, is cut away at the point of intersection of said walls, as at 18, for the specific purpose of permitting a longer path of inward travel of the ball section 13. Thus, the main valve is permitted further movement away from the shoulder than is customary.

Between the shoulder 17 and the inner end of the body 5, there is slidably mounted in the bore of the body a cylindrical sleeve 19. This has an opening formed in its side wall receiving an eccentric lug or cam projection 20 extended into the bore from the inner end of an adjustment pin 21. Pin 21 is rotatable in an opening 22 formed in the body 5, that merges into an enlarged recess 23.

Seated on the shoulder defined by the communicating opening 22 and recess 23 is a gasket 24 for preventing leakage, this being disposed below a collar 25 of the pin. A bushing or lock nut 26 is threadable into recess 23. When loosened, the lock nut permits the pin 21 to be turned, as a result of which the sleeve 19 is adjusted forwardly or rearwardly, under the camming action of the eccentric lug 21. When such an adjustment has been effected, the lock nut is tightened against the collar 25 of the pin, locking the pin, and therefore the sleeve, in the adjusted position, and sealing the openings against leakage.

The faucet is separable, for ease in cleaning and assembly. To this end, there is detachably connected to the inner end of the body 5 a hollow shank 27, the connection being effected by a coupling nut 28. A gasket makes this connection suitably leak-tight as shown. Together, the body 5 and shank 27, having communicating bores one of which is an extension of the other, may be said to constitute a barrel.

A stem 29 has a reduced portion 30 extended through the sleeve 19, thus defining an annular shoulder 31 intermediate the ends of the stem. A small nut 32 is threaded on the reduced portion, and constitutes a head therefor. A spring 33 surrounds the reduced portion, and is held under compression between the head 32 and a web 34 on the inner end of the sleeve 19. The reduced portion extends through this web 34, and the shoulder 31 abuts against the web, as best shown in Figures 3 and 4.

It may now be noted, by reference to these figures, that regardless of the position to which the sleeve 19 is adjusted, whether to its extreme positions (Figures 3 and 4), or an intermediate position, it will carry with it the stem, since spring 33, continuously urging the stem to the left in Figure 3, will at all times hold the shoulder 31 yieldably against web 34 of the sleeve.

At 35 I have illustrated the flow control valve, which in the present instance is in the shape of a conically tapered and relatively elongated plug. This seats in a correspondingly tapered portion 36 of the bore of the shank 27, and thus defines a restricted annular passage the varying of which affects the velocity and quantity of flow.

At its large end, the valve is detachably connected to the stem 29, while the small end of the valve is adapted to engage in a seat 37.

The whole purpose of the sleeve 19 and the means for varying its position is to effect an adjusted setting of the flow control valve 35 to a normal open position, as shown, for example, in Figure 4. This setting is made on installation, and when it is made, the sleeve is locked as described. The particular point to which the sleeve and valve are moved will depend on the amount of pressure, length and size of the supply lines and coils, and other known factors.

Normally, the head 32 of the stem is spaced from the main valve 16 a short distance (Figure 3). Therefore, when the main valve is opened, it is brought against the head, as in Figure 4. Where the beer is presenting no problems in drawing, and the adjusted normal setting of the flow control valve is permitting the drawing of a good glass, the bartender simply brings the main valve to rest against the head 32 as in Figure 4, and does not disturb the position of the head. However, if it immediately becomes apparent, as he begins drawing, that an adjustment is necessary as to the flow control valve, to restrict further the annular passageway defined thereby, all that is necessary is that he draw the knob lever further toward him, the result being that the main valve will urge the head, and therefore the flow control valve, rearwardly, against the action of the spring. It is to permit this further movement that the cutaway part 18 is provided. Such further movement of the main valve does not affect its own operation in any way, since as stated, the main valve opening at shoulder 17 is of constant diameter.

The advantages here can readily be seen. Whereas in conventional faucets, abnormal drawing conditions must be taken care of by operation of an adjustment means separate from the knob lever, in the invention the bartender retains full control and can close the flow control valve instantaneously, using the knob lever, then, and still using said lever, opening it slowly until he has the valve at the exact position needed to meet the abnormal conditions.

When the main valve is moved back to closed position, the spring, tending to expand, immediately returns the flow control valve to the normal open position to which it was previously adjusted by means of the sleeve 19 and associated parts.

With the faucet, it is also possible to "spit the faucet" without loss of any more beer than the operator actually wants to discharge. During use of any beer faucet, some beer will be trapped behind the main valve when the valve is closed. Additionally, gases may rise to the faucet, this being the highest point of the system. This beer and gas affects adversely the next drawing, especially if the faucet is not used for a period of time and tends to become warmer. With a faucet constructed in accordance with the invention, the bartender, before drawing the next glass, draws the knob lever toward him the full extent of its travel. This not only opens the main valve, but also, closes the flow control valve completely, thus "spitting the faucet" of the trapped beer and gases while yet preventing the loss of good beer through the drain.

At 38 I have designated a wall of the tap box or cabinet, the shank 27 being threaded through the usual opening in the wall and being mounted therein by removable retaining ring 39 cooperating with flanged lock nut 40.

At 41 is illustrated a vent, this being formed in the upper portion of the side wall of the body 5, forwardly of the main valve seat. I have found that this vent well serves the purpose of exhausting expanded gas in the flowing beer, that it also has value in disposing of beer which would otherwise be vacuum held, and that it avoids dripping.

It may be pointed out that in addition to the operating characteristics of the faucet described above, the faucet can be smaller than other dual-valve faucets, and embodies comparatively few parts considering its said characteristics. Additionally, it is capable of easy assembly and disassembly, as for cleaning or installation. The small size and reduction in number of parts is of importance in a beer faucet, in that it chills and stays chilled more easily, and reduces the amount of beer that can be trapped therein.

I claim:

1. In a beer faucet, a barrel, a lever-actuated main valve in the barrel, a flow control valve in the barrel, and resilient means in the barrel for holding the flow control valve in the open position, the flow control valve being nonresponsive to the normal opening movement of the main valve, and positioned to be shifted toward closed position by the extreme opening movement of the main valve.

2. In a beer faucet, a barrel, a lever-actuated main valve in the barrel, a flow-control valve in the barrel, means carried by the flow control valve and engageable by the main valve, whereby to shift the flow-control valve responsive to extreme movement of the main valve, and resilient means urging the flow control valve to the open position.

3. In a beer faucet, a barrel, a lever-actuated main valve in the barrel, a normally open flow-control valve in the barrel, means retaining the flow control valve in the open position, and means, engageable by the main valve when opened beyond a predetermined position, adapted to shift the flow control valve toward closed position.

4. In a beer faucet, a barrel, a lever-actuated main valve in the barrel, a normally open flow-control valve in the barrel, and a spring-urged stem, extending from the flow control valve, positioned for engagement by the main valve when the main valve has been shifted to an open position, said spring-urged stem being adapted to adjust the flow control valve toward a closed position responsive to continued shifting of the main valve, and to return it to its normal position when no longer engaged by the main valve.

5. A beer faucet including a barrel, a lever-actuated main valve in the barrel, a flow-control valve in the barrel, an adjusting means adapted to set the flow-control valve in an adjusted normal open position, and a spring-urged stem, being adapted to adjust the flow control valve toward a closed position responsive to continued shifting of the main valve, and to return it to its normal position when no longer engaged by the main valve.

6. A beer faucet including a barrel, a main valve therein, a lever for shifting the main valve, a flow control valve spaced from the main valve, a sleeve slidable in the barrel between the valves, means for adjusting the position of the sleeve and for locking it in adjusted position, a stem carried by the flow control valve and extended through the sleeve, and a spring held under compression between the free end of the stem and sleeve, whereby adjustment of the sleeve will adjust the flow control valve, the stem being positioned for engagement by the main valve on shifting thereof to open position, thereby to shift the flow-control valve from the position to which adjusted by the sleeve, toward a closed position, responsive to further movement of the main valve.

7. A beer faucet as in claim 6, wherein the means for adjusting the sleeve, and for locking it include a rotatable cam extended into the side wall of the sleeve, and a bushing surrounding the cam and threadable into the wall of the barrel to lock the cam against movement.

8. A beer faucet as in claim 6, wherein the wall of the barrel is provided with a release vent for exhausting expanded gas of beer flowing through the faucet intermediate its ends.

ROGER DEL NERO.

REFERENCES CITED

The following references are of record in the file of this patent:

UNITED STATES PATENTS

| Number | Name | Date |
| --- | --- | --- |
| 2,170,922 | Marr | Aug. 29, 1939 |
| 2,185,267 | Rice | Jan. 2, 1940 |
| 2,297,857 | Anagno | Oct. 6, 1942 |
| 2,345,840 | Strong | Apr. 4, 1944 |